W. N. FORT.
Gate.
No. 218,513. Patented Aug. 12, 1879.
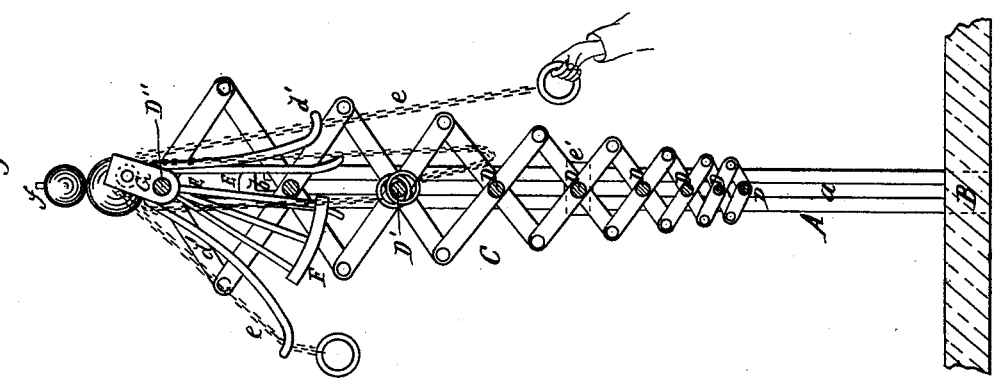
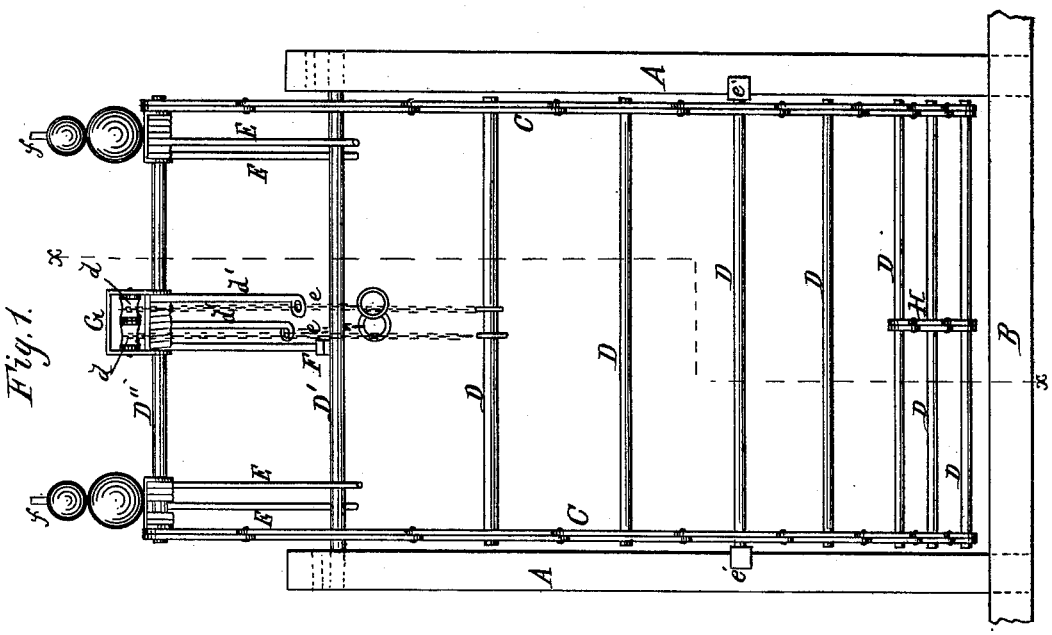
WITNESSES:
Henry N. Miller
C. Sedgwick
INVENTOR:
W. N. Fort
BY Munn & Co.
ATTORNEYS.

UNITED STATES PATENT OFFICE.

WILSON N. FORT, OF LEWISVILLE, ARKANSAS.

IMPROVEMENT IN GATES.

Specification forming part of Letters Patent No. 218,513, dated August 12, 1879; application filed June 11, 1879.

*To all whom it may concern:*

Be it known that I, WILSON NELMS FORT, of Lewisville, in the county of La Fayette and State of Arkansas, have invented a new and Improved Gate, of which the following is a specification.

The object of this invention is to furnish a strong and durable gate, that cannot sag nor become clogged with snow, and which is very easily opened and closed.

It consists of a gate composed of parallel bars, one fixed between side posts, and the remainder pivoted in lazy-tongs, on either side, which depend from the fixed bar. The upper pivoted bar is connected with a chain running over a pulley sustained on a rod connecting the two upper ends of the lazy-tongs, by pulling which the lazy-tongs are folded up or contracted and the gateway opened.

The invention also consists of a locking device operated by the lifting-chain, which prevents the gate from being opened by lifting it by the rods or bars below.

In the accompanying drawings, Figure 1 is a front elevation of my improved gate, and Fig. 2 is a vertical cross-section on line $x\ x$.

Similar letters of reference indicate corresponding parts.

Referring to the drawings, A A are the side posts of the gate, preferably made of iron, and set in a base, B, of stone or wood let into the ground. The posts have on their inner faces longitudinal grooves $a$, which serve as guides for the ends of the bars, which are designed to project through the lazy-tongs into them.

The sides of the gate are composed of lazy-tongs C C, and these are joined by parallel bars D, the ends whereof are passed through the arms of the lazy-tongs where they cross each other, as clearly shown in Fig. 2. The arms of the lazy-tongs decrease in length from top to bottom, giving thus a taper to the lazy-tongs, and decreasing the distance between the points of crossing, where the bars are pivoted, and the space between the lower bars, D. The object of this is to prevent small animals from going through the bars. The upper bar, D', is passed through the lazy-tongs, and has its ends fixed in slots $b$, which have opening through the side of the post, so that the bar can be lifted out and in without difficulty, and with it the gate, which depends from it. The terminal arms of the lazy-tongs above the bar D' are joined by a bar, D''. From this bar, on either side, depend arms E E, extending down from below the fixed bar D'. These serve as guides for the other bars below when the gate is opened, and as a support for the lazy-tongs, preventing them from turning out from the posts.

A curved lock or stop, F, depends from the bar D'' at the center, in such a way that when hanging vertical it is in contact with the fixed bar D', and the gate is closed, as in Fig. 1. The rods supporting this lock have their upper ends curved over the bar D'', and connected with a sheave, G, pivoted on the bar D'', and carrying two pulleys, $d\ d$. To the same sheave are fixed the upper ends of arms $d'\ d'$, one extending downward on each side of the gate, and having eyes on their lower ends, through which chains $e$ are run up and over pulleys $d\ d$, and thence carried down on each side, where their ends are attached to the upper bar, D', as clearly shown in the drawings.

On the outside of the lazy-tongs jaws $e'\ e'$ are pivoted to the ends of the rods D and clasp the posts A A, serving as guides in contracting and expanding the lazy-tongs, and also to prevent the gate from being pushed one way or the other from between the posts.

At each end of bar D'' rods $f\ f$ project upward and carry suitable counterbalancing-weights to facilitate the opening of the gate.

The operation of this gate is as follows: The fixed bar D' serves as a pivot, from which the lazy-tongs expand, toward which they contract, in the first case carrying the bars D downward and bar D'' upward, closing the gate, as in Fig. 1. In this condition the lock F rests on top of the bar D', and prevents bar D'' from being drawn down, or the lower bar, D, from being drawn up, as one part of the lazy-tongs cannot be moved without the whole, thus locking the gate.

To open the gate, grasp one of the chains $e$, and with it pull the arm $d$ through which it runs outward. This throws the sheave G over and the curved lock out from the bar D'. Now pull the chain. This draws the bar D'' down, contracting the lazy-tongs, and, throwing the bars D up, opens the gate in the manner partially shown in Fig. 2. To close the gate, release the chain, when its own weight will cause the lazy-tongs to expand, and thus close down the bars D, and when it has reached the proper point the lock will fall over bar D', and thus lock the gate.

The last three bars of the gate are connected together at the center by short lazy-tongs H, which give strength to this part, and prevent the bars from springing apart and allowing small stock to pass through.

Instead of decreasing the length of the arms of the lazy-tongs to lessen the space between the bars at the bottom, the arms may be of the same length and the space lessened by inserting additional bars and pivoting the ends of the arms of the lazy-tongs.

Having thus fully described my invention, I claim as new and desire to secure by Letters Patent—

1. As an improvement in gates, the lazy-tongs C C, forming the sides of the gate, connected by pivoted cross-bars D, in combination with the side posts, A A, and bar D', passed through the lazy-tongs into the side posts, A A, and supporting thus the lazy-tongs, the whole combined and arranged to form a gate opened by the contraction of the lazy-tongs, and closed by expanding the same, substantially as described.

2. In combination with the lazy-tongs C C, cross-bars D, and fixed supporting-bar D', the bar D'', connecting the terminal arms of the lazy-tongs above the fixed bar D', and carrying the pulleys $d\,d$ and chains $e$, passed over the said pulleys and connected with the upper bar, D, for the purpose of facilitating the opening of the gate, substantially as described.

3. In combination with the gate composed of lazy-tongs C C and connecting cross-bars D and fixed supporting-bar D', the lock F, depending from the bar D'', to prevent the opening of the gate, arms $d'$, connected through the sheave with the rods of lock F, and having eyes on their lower ends, through which the chains $e$ are passed, so that by drawing the chain outward the arms are turned and the lock removed from the bar D', thereby permitting the gate to be opened, substantially as described.

4. The lazy-tongs C C, composed of bars decreasing in length from the top to the bottom, as shown, in combination with cross-bars D, whereby the space between these bars decreases toward the bottom, and thus prevents small animals from getting through the gate, substantially as described.

WILSON NELMS FORT.

Witnesses:
R. B. STRANGE,
W. L. NANCE.